(12) United States Patent
Bentivoglio et al.

(10) Patent No.: US 11,352,121 B2
(45) Date of Patent: Jun. 7, 2022

(54) FASTENING UNIT FOR MOVABLY FASTENING AN AIRCRAFT COMPONENT TO A SUPPORT STRUCTURE OF AN AIRCRAFT

(71) Applicant: Airbus Operations GmbH, Hamburg (DE)

(72) Inventors: Marc Antonio Bentivoglio, Hamburg (DE); Marco Biondini, Hamburg (DE)

(73) Assignee: Airbus Operations GmbH

( * ) Notice: Subject to any disclaimer, the term of this patent is extended or adjusted under 35 U.S.C. 154(b) by 177 days.

(21) Appl. No.: 16/634,385

(22) PCT Filed: Jul. 30, 2018

(86) PCT No.: PCT/EP2018/070556
§ 371 (c)(1),
(2) Date: Jan. 27, 2020

(87) PCT Pub. No.: WO2019/025343
PCT Pub. Date: Feb. 7, 2019

(65) Prior Publication Data
US 2021/0053671 A1 Feb. 25, 2021

(30) Foreign Application Priority Data
Jul. 31, 2017 (DE) ...................... 10 2017 117 314.5

(51) Int. Cl.
*B64C 9/02* (2006.01)
(52) U.S. Cl.
CPC ..................... *B64C 9/02* (2013.01)
(58) Field of Classification Search
CPC .................................................. B64C 9/02
See application file for complete search history.

(56) References Cited

U.S. PATENT DOCUMENTS 1,967,901 A * 7/1934 Ragsdale .................. B64C 9/02
244/87
2,376,745 A 5/1945 Wimer et al.
(Continued)

FOREIGN PATENT DOCUMENTS

CN 201971151 U 9/2011
CN 105109670 A 12/2015
(Continued)

OTHER PUBLICATIONS

German Search Report for Application No. 102017117314.5 dated Feb. 5, 2018, 2 pages (p. 2 categorizing the references).
(Continued)

*Primary Examiner* — Richard R. Green
*Assistant Examiner* — William L Gmoser
(74) *Attorney, Agent, or Firm* — Lerner, David, Littenberg, Krumholz & Mentlik, LLP (57) ABSTRACT

The invention relates to a fastening unit (100) for movably fastening an aircraft component (300) to a support structure (400) of an aircraft (500). The fastening unit (100) has a connection element (5) having a hole (5a). The fastening unit (100) also has a first support arm (1) having a first end (1a) for connecting to the support structure (400) of the aircraft (500) and having a second end (1b) for connecting to the connection element (5). The fastening unit (100) also has a second support arm (2) having a first end in (2a) for connecting to the support structure (400) of the aircraft (500) and having a second end (2b) for connecting to the connection element (5). The first support arm (1) and the second support arm (2) are arranged in such a way that a distance (d) between the first end (1a) of the first support arm (1) and the first end (2a) of the second support arm (2) is greater than a distance (e) between the second end (1b) of the first support arm (1) and the second end (2b) of the second
(Continued)

support arm (2). The first support arm (1) is produced at least partly by means of a deformation method. The invention further relates to the use of a fastening unit (100) for fastening a rudder (300) to a support structure (400) of an aircraft (500) and to a method for providing movable fastening of an aircraft component (300) to support structure (400) of an aircraft.

14 Claims, 7 Drawing Sheets

(56) References Cited

U.S. PATENT DOCUMENTS

| | | | | |
|---|---|---|---|---|
| 2,381,350 | A | | 8/1945 | Hall |
| 2,418,060 | A | * | 3/1947 | Watter .................... B64C 13/00 |
| | | | | 244/123.1 |
| 2,421,960 | A | * | 6/1947 | Pagon ....................... B64C 9/02 |
| | | | | 192/18 B |
| 4,247,061 | A | * | 1/1981 | Kuczynski .............. F16F 15/02 |
| | | | | 244/17.19 |
| 8,783,618 | B2 | | 7/2014 | Vera Villares et al. |
| 8,857,765 | B2 | | 10/2014 | Thomas et al. |
| 9,180,956 | B1 | | 11/2015 | Thomas et al. |
| 2009/0072090 | A1 | | 3/2009 | Kallinen et al. |
| 2009/0308981 | A1 | * | 12/2009 | McAlinden ............... B64C 9/02 |
| | | | | 244/131 |
| 2010/0155532 | A1 | | 6/2010 | Ariza Martin et al. |

FOREIGN PATENT DOCUMENTS

| | | | | |
|---|---|---|---|---|
| EP | 1550606 | A2 | 7/2005 | |
| EP | 2444315 | A2 | 4/2012 | |
| EP | 2801519 | A1 | 11/2014 | |
| ES | 2369914 | T3 | 12/2011 | |
| GB | 177250 | A * | 3/1922 | ............... B64C 9/02 |

OTHER PUBLICATIONS

International Search Report from Application No. PCT/EP2018/070556 dated Sep. 19, 2018, 3 pages.

* cited by examiner

FASTENING UNIT FOR MOVABLY FASTENING AN AIRCRAFT COMPONENT TO A SUPPORT STRUCTURE OF AN AIRCRAFT

CROSS-REFERENCE TO RELATED APPLICATIONS

The present application is a national phase entry under 35 U.S.C. § 371 of International Application No. PCT/EP2018/070556 filed Jul. 30, 2018, published in German, which claims priority from German Patent Application No. 10 2017 117 314.5 filed Jul. 31, 2017, all of which are incorporated herein by reference.

AREA OF THE INVENTION

The present invention concerns the fastening of aircraft components. In particular, the invention concerns a fastening unit for movably fastening an aircraft component to a support structure of an aircraft, and the use of a fastening unit for fastening a rudder to a support structure of an aircraft, and a method for producing a movable fastening of an aircraft component to a support structure of an aircraft.

BACKGROUND OF THE INVENTION

Today, widely varying types of fastening devices for vehicles are used in order to attach components, in particular aerodynamic components, to support structures of the vehicle. Various production methods are used which guarantee the necessary stability of the fastening devices, which at the same time are easy to mount and cheap to produce. However, such components are often still too expensive to produce and sometimes the complexity of installation of the components is high since any inaccuracies in production must be compensated, which makes installation difficult.

EP 2 444 315 A1 describes a device for fastening a tail fin of an aircraft in a rear fuselage region of the aircraft, wherein the device is produced integrally from a composite material.

EP 1 550 606 A3 describes a tail fin connection to an aircraft fuselage in which the force flow resulting from the connection between the tail fin spar and the fuselage frame runs largely homogenously from the tail fin spar to the fuselage frame and continues into the fuselage.

SUMMARY OF THE INVENTION

It is an object of the present invention to reduce the costs of production of fastenings for movably fastening components to support structures.

This object is achieved by the subject of the independent claims. Exemplary embodiments arise from the dependent claims and the description which follows.

According to one aspect of the invention, a fastening unit is provided for movably fastening an aircraft component to a support structure of an aircraft. The fastening unit comprises a connection element with an opening. The fastening unit furthermore comprises a first support arm with a first end for connecting the first support arm to the support structure of the aircraft, and a second end for connecting the first support arm to the connection element. The fastening unit furthermore comprises a second support arm with a first end for connecting the second support arm to the support structure of the aircraft, and a second end for connecting the second support arm to the connection element. The first support arm and the second support arm are arranged such that a distance between the first end of the first support arm and the first end of the second support arm is greater than a distance between the second end of the first support arm and the second end of the second support arm. For example, this distance is defined as the distance between two mutually facing side faces of the support arms. Preferably, the distance between the two support arms decreases continuously starting from the first ends towards the second ends. The first support arm is produced at least partially by means of a forming process. The second support arm may also be produced partially by means of a forming process.

The fastening unit may be designed for example for movably fastening a rudder to a support spar of a tail fin of an aircraft. In particular, the fastening unit is designed for movably fastening a rudder to a tail fin of an aircraft. However, such a fastening unit may also be used for fastening another aerodynamic aircraft component which is movable relative to a support structure of the aircraft, such as for example an elevator, an air brake or a high-lift device in the form of leading and trailing edge flaps on wings.

The support structure may for example be a support spar of a tail fin. For example, the support structure is a so-called rear spar of a tail fin. Again, the fastening unit may be rigidly attached to said support spar in order to provide the movable fastening of the rudder to the support spar via a rotatable connection by the connection element.

Such a fastening unit may reduce the costs of production, in particular in comparison with fastening units produced by a milling process or an injection-molding process. The individual components of the fastening unit may be produced separately by means of the forming process, and it is no longer necessary to produce the entire fastening unit in one piece for milling or as a complete component by injection molding. This not only lowers production costs but may also lead to a greater stiffness of the individual components of the fastening unit. Furthermore, it may be easier to compensate for tolerances in mounting of the fastening unit to the support structure and to the aircraft component.

A forming process is a moldable shaping of a preform or blank into a formed component. This means that the preform is brought into another shape in order thus to produce a formed component, which in the present case may be the first or the second support arm.

The components may be plastically deformed. For example, a forming process may include compression forming, indirect compression forming, tension forming, bending, or shear-force forming. Compression forming processes include for example rolling, free forming, closed die forging, indentation forming and extrusion. Indirect compression forming processes include for example drawing, deep drawing, plunging, pressing and upset bulging. Tension forming processes include for example extending, widening and deepening. Bending processes include for example bending with rectilinear tool movement, and bending with rotating tool movement. Shear-force forming processes include for example shifting and twisting. The first support arm and/or the second support arm may be produced or made by one or more of these methods. It may be provided that the first and second support arms are produced exclusively by a forming process.

It may be provided that the aircraft components are movably fastened to a support structure of the aircraft via the fastening unit. In particular, the fastening unit may be rigidly attached to the support structure of the aircraft, whereas the aircraft component is movably attached to the fastening unit.

The movable fastening of the aircraft component to the fastening unit is achieved for example by means of the connection element.

The opening in the connection element is for example a recess in the connection element or a continuous hole through the connection element. The opening is preferably a bore through the connection element. The connection element may be a fork head or a tab with an eye. The connection element is designed for movably fastening a bolt or rod of the aircraft component to be fastened to the fastening unit. In this way the aircraft component may be movably fastened to the support structure of the aircraft.

The first support arm and the second support arm may each have a profile form, i.e. a profile cross-section. The two support arms may be fastened to the support structure of the aircraft via a respective or a common fastening element. The first support arm may be fastened at its first end to the support structure via the fastening element, and the second support arm may be fastened at its first end to the support structure by the same or a further fastening element. In any case, the first support arm is attached to the connection element by its second end, and the second support arm is also attached to the connection element by its second end.

The first support arm and the second support arm may have an elongate form. In particular, both support arms may be designed as an elongated profile. The first support arm may extend in a main extension direction of the first support arm, but be designed slightly bent. Similarly, the second support arm may extend in a main extension direction of the second support arm but be designed slightly bent. The bend in the main extension direction of the support arms may provide an arrangement which allows the fastening unit to taper starting from the first ends towards the second ends of the support arms. In particular, the outer edges or outer faces of the support arms may run towards each other in the direction of the second ends of the support arms. The support arms are designed for transmission of loads and could also be described as fastening arms or generally as fastening elements.

The fastening elements, the connection element and the first and second support arms may be produced as separate components. The fastening elements and the first and second support arms may be produced by means of the bending process. The connection element may be produced by a milling process. Separate production decreases the costs of production and facilitates assembly, since tolerances can be compensated more easily. Separate production means for example that the elements are provided as individual parts and can then be assembled.

A first distance between the first end of the first support arm and the first end of the second support arm is greater than a second distance between the second end of the first support arm and the second end of the second support arm. The first distance may be defined as the distance between a side face of the first support arm and a side face of the second support arm. The second distance may also be defined as the distance between a side face of the first support arm and a side face of the second support arm.

According to one embodiment of the invention, the first support arm and/or the second support arm are produced by means of a bending process. Preferably, the first support arm and the second support arm are produced by means of a sheet-metal forming process.

The bending process may comprise cold forming or hot forming. This means that the bending process for forming by bending may be carried out at ambient temperature (cold forming) or with the introduction of heat into the component to be formed (hot forming).

According to a further embodiment of the invention, the first support arm and/or the second support arm are produced at least partially from a metallic material.

Here, the support arms may be made of aluminum or an aluminum alloy. Furthermore, it is possible that the connection element and the fastening element are also made of aluminum or an aluminum alloy. However, other metallic materials may be used to produce these elements of the fastening unit. For example, the first and the second support arm may be made of titanium or a titanium alloy. Furthermore, the connection element and the fastening elements may also be made of titanium or a titanium alloy.

According to a further embodiment of the invention, the first support arm and the second support arm have a U-shaped profile.

Here a blank, present in the form of a flat plate, may be brought by the forming process, for example by bending, into the U-shaped profile form in order to obtain the first and second support arms. Furthermore, the U-shaped profile form may be achieved by extrusion of the metallic material to achieve the desired form of the first and second support arms. By bending, stresses may be introduced into the first and second support arms which ensure an increase in strength and stiffness. In this way, in comparison with production of such components by milling or injection-molding, an increased strength may be achieved.

According to a further embodiment of the invention, a distance between a flange of the U-shaped profile of the first support arm and a flange of the U-shaped profile of the second support arm decreases starting from the first end of the first support arm in the direction of the second end of the first support arm.

In this way, the fastening unit tapers starting from the respective first ends of the two support arms up to the respective second ends of the two support arms. In particular, in this way, the fastening unit may be adapted to the form of the aircraft component which is to be attached to the support structure of the aircraft. In the case that the aircraft component is a rudder, the fastening unit may thus be adapted to the aerodynamic form of the tail fin.

The U-shaped profile of the first support arm may in particular have a first and a second flange, and a web connecting the two flanges. Also, the U-shaped profile of the second support arm may have a first and a second flange, and a web connecting the two flanges.

To reduce the distance between the two support arms starting from the first ends towards the second ends, both support arms may also be bent. This will be explained in more detail in the description of the figures.

According to a further embodiment of the invention, the connection element is arranged between two flanges of the first support arm. Alternatively or additionally, the connection element is arranged between two flanges of the second support arm. For example, the connection element is inserted between the flanges of the respective support arms.

The connection element is for example fastened to the respective second ends of the support arms by a fastening means. The fastening means may be a riveted connection, a bolted connection, a screwed connection, a welded connection or combination thereof. Preferably, the second ends of the support arms are attached to the connection element by means of a bolted connection or a riveted connection.

According to a further embodiment of the invention, the fastening unit comprises a first fastening element, via which the first end of the first support arm is attached to the support structure of the aircraft. The first fastening element is furthermore produced by means of a bending process.

This means that the first fastening element is produced separately from the first support arm. The first fastening element has for example an L-shaped profile or a T-shaped profile. It is possible that the first fastening element fastens the first support arm to the support structure of the aircraft without the first support arm itself being in contact with the support structure. In this case, a flange of the L-shaped profile of the first fastening element may be arranged between the first support arm and the support structure when the fastening unit is attached to the support structure.

According to a further embodiment of the invention, the fastening unit comprises a second fastening element via which the first end of the second support arm is attached to the support structure of the aircraft. The second fastening element may be produced by means of a bending process. Preferably, the first fastening element and the second fastening element are produced by means of a sheet-metal forming process. The support arms and the fastening elements may be designed in the form of individual sheet metal parts.

The second fastening element is produced separately from the second support arm. The second fastening element has for example an L-shaped profile or a T-shaped profile. It is possible that the second fastening element attaches the second support arm to the support structure of the aircraft without the second support arm itself being in contact with the support structure. In this case, a flange of the L-shaped profile of the first fastening element may be arranged between the second support arm and the support structure when the fastening unit is attached to the support structure.

According to a further embodiment of the invention, the fastening unit comprises a third support arm with a first end for connecting the third support arm to the support structure of the aircraft, and a second end for connecting the third support arm to the connection element. Furthermore, the fastening unit comprises a fourth support arm with a first end for connecting the fourth support arm to the support structure of the aircraft, and a second end for connecting the fourth support arm to the connection element. The third support arm and the fourth support arm are arranged such that a distance between the first end of the third support arm and the first end of the fourth support arm is greater than a distance between the second end of the third support arm and the second end of the fourth support arm.

All features described above in relation to the first and second support arm apply accordingly to the third and fourth support arm. In particular, the first support arm may be arranged mirror-symmetrically to the third support arm relative to a plane of symmetry of the fastening unit, and the second support arm may be arranged mirror-symmetrically to the fourth support arm. Furthermore, it is possible that the first support arm is identical in shape to the fourth support arm, wherein the second support arm is identical in shape to the third support arm. This correlation will be explained in more detail below in the description of the figures.

Due to the arrangement of four support arms, it is possible to increase the stiffness by enlarging the gap between the upper and lower support arms. Furthermore, the stiffness may be increased by changing the plate thickness of the support arms or fastening elements, and by changing the height of the flanges of the support arms and fastening elements.

According to a further embodiment of the invention, the connection element is arranged between the first support arm and the third support arm. In addition or alternatively, the connection element is arranged between the second support arm and the fourth support arm.

The fastening element may thus be in contact with the first, second, third and fourth support arms. The connection element may terminate flush with the flanges or side faces of the support arms when the connection element is attached to the support arms. The connection element may be a substantially plate-shaped element which has at least two regions with different thicknesses. A first region may have a smaller thickness than a second region, wherein the second ends of the respective support arms are fastened to the first region of the connection element, or may stand in contact therewith, and the opening is provided in the second region of the connection element.

According to one aspect of the invention, the use of a fastening unit as described above for fastening a rudder to a support structure of an aircraft is specified. For example, the fastening unit may be used for fastening the rudder to a tail fin of the aircraft.

According to a further aspect of the invention, an aircraft is indicated, in particular an aircraft with a fastening unit as described above.

According to a further aspect of the invention, a method is specified for producing a movable fastening of an aircraft component to a support structure of an aircraft. Here, the aircraft component is movably fastened to the support structure. In a step of the method, a connection element with an opening is provided. In a further step, a first preform is formed into a first profiled support arm with a first end and a second end. In a further step, a second preform is formed into a second profiled support arm with a first end and a second end. In a further step, the first support arm is arranged relative to the second support arm such that a distance between the first end of the first support arm and the first end of the second support arm is greater than a distance between the second end of the first support arm and the second end of the second support arm. In a further step, the first end of the first support arm is connected to the support structure. In a further step, the first end of the second support arm is connected to the support structure. In a further step, the second end of the first support arm is connected to the connection element. In a further step, the second end of the second support arm is connected to the connection element.

To summarize, the fastening unit may comprise several sheet metal parts which are formed by plastic forming (cold/hot) and then assembled by means of fastening means such as rivets, bolts, screws etc. In this way, tolerances can be compensated and production costs reduced.

DETAILED DESCRIPTION OF EXEMPLARY EMBODIMENTS

The depictions in the figures are diagrammatic and not to scale.

Where, in the following description of the figures, the same reference signs are used in different figures, these designate the same or similar elements. The same or similar elements may however also be designated with different reference signs.

Figure 1A:
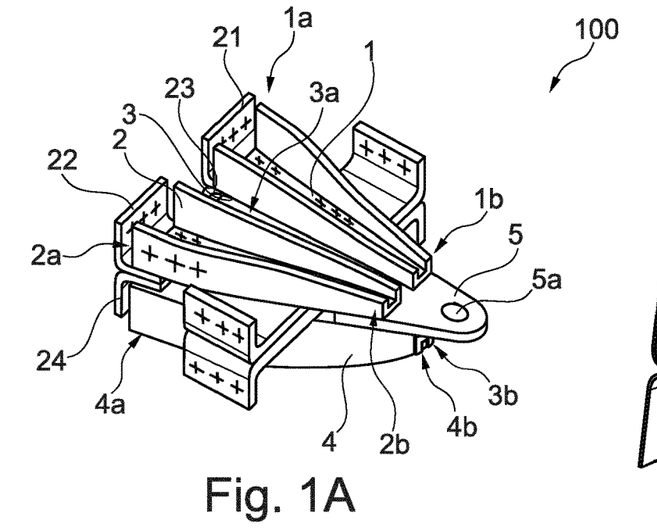
FIG. 1A shows a fastening unit with four support arms according to an exemplary embodiment of the invention.

FIG. 1A shows a fastening unit 100 with precisely four support arms 1, 2, 3, 4. The fastening unit 100 may be designed for movably fastening an aircraft component to a support structure of an aircraft. For the sake of clarity, the support structure and the aircraft components are not shown in FIG. 1A, but only the fastening unit 100 is shown. The fastening unit 100 has a connection element 5 with an opening 5a. The opening 5a is a continuous hole, in particular a passage bore for receiving a bolt (not shown in FIG. 1A) via which the aircraft component is held movably on the fastening unit 100. The fastening unit 100 has a first support arm 1 with a first end 1a for connecting the first support arm 1 to the support structure (not shown) of the aircraft, and a second end 1b for connecting the first support arm 1 to the connection element 5. The fastening unit 100 furthermore has a second support arm 2 with a first end 2a for connecting the second support arm 2 to the support structure (not shown) of the aircraft, and a second end 2b for connecting the second support arm 2 to the connection element 5.

The fastening unit also has a third support arm 3 with a first end 3a for connecting the third support arm 3 to the support structure (not shown) of the aircraft, and a second end 3b for connecting the third support arm 3 to the connection element 5. Furthermore, the fastening unit 100 has a fourth support arm 4 with a first end 4a for connecting the fourth support arm 4 to the support structure (not shown) of the aircraft, and a second end 4b for connecting the fourth support arm 4 to the connection element 5. The connection element 5 is arranged in the region of the second end 1b of the first support arm 1, at least partially between the first support arm 1 and the third support arm 3. The connection element 5 is arranged in the region of the second end 2b of the second support arm 2, at least partially between the second support arm 2 and the fourth support arm 4.

The first support arm 1 may be arranged mirror-symmetrically to the third support arm 3 relative to a plane of symmetry of the fastening unit 100, and the second support arm 2 may be arranged mirror-symmetrically to the fourth support arm 4, wherein the plane of symmetry lies for example in an extension plane of the connection element 5.

The fastening unit 100 has a first fastening element 21 for fastening the first support arm 1 to the support structure, a second fastening element 22 for fastening the second support arm 2 to the support structure, a third fastening element 23 for fastening the third support arm 3 to the support structure, and a fourth fastening element 24 for fastening the fourth support arm 4 to the support structure.

All fastening elements 21, 22, 23, 24 have an L-shaped cross-sectional profile. A flange of the L-shaped profile of the first fastening element 21 lies on a flange of the L-shaped profile of the third fastening profile 23.

Figure 1B:
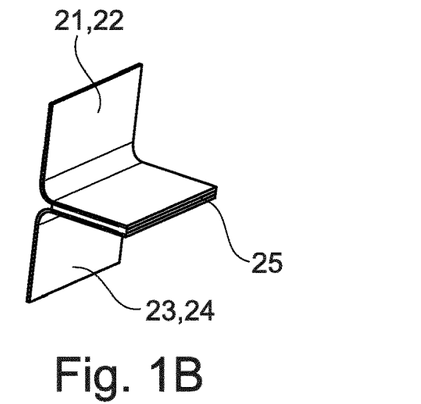
FIG. 1B shows fastening elements with a spacer element according to an exemplary embodiment of the invention.

As evident in FIG. 1B, a plate-like spacer element 25 may be arranged between the flanges or legs of the L-shaped profiles of the two fastening elements 21, 23.

A flange of the L-shaped profile of the second fastening element 22 lies on a flange of the L-shaped profile of the fourth fastening profile 24.

As evident from FIG. 1B, a plate-like spacer element 25 may also be arranged between the flanges or legs of the L-shaped profiles of the two fastening elements 22, 24. The fastening elements 21, 22, 23, 24 are produced by means of a forming process, in particular by means of a bending process. However, the fastening elements 21, 22, 23, 24 may also be produced by means of a milling process.

Figure 1C:
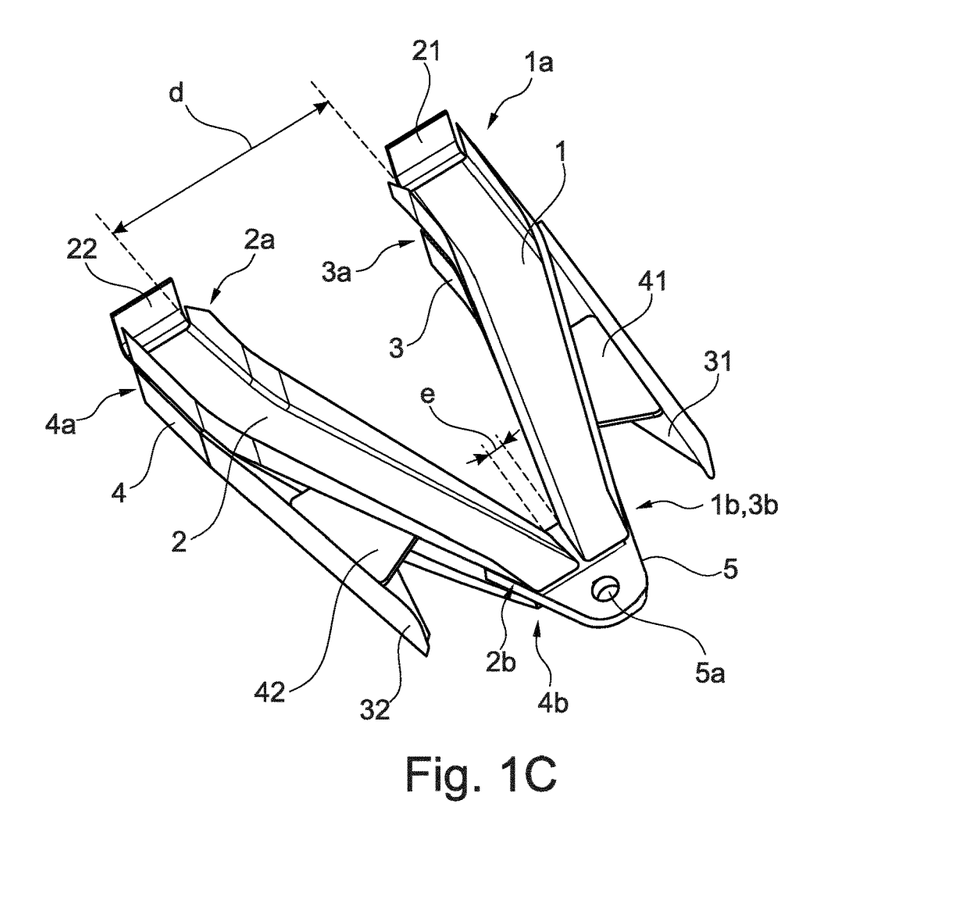
FIG. 1C shows a fastening unit with four support arms according to a further exemplary embodiment of the invention.

FIG. 1C shows a further exemplary embodiment of the fastening unit 100 with four support arms 1, 2, 3, 4. The first support arm 1 and the second support arm 2 are arranged such that the distance d between the first end 1a of the first support arm 1 and the first end 2a of the second support arm 2 is greater than the distance e between the second end 1b of the first support arm 1 and the second end 2b of the second support arm 2. For example, the distances d, e are defined as respective distances between two mutually facing flanges or side faces of the support arms 1, 2. The third support arm 3 and the fourth support arm 4 are arranged such that the distance d between the first end 3a of the third support arm 3 and the first end 4a of the fourth support arm 4 is greater than the distance e between the second end 3b of the third support arm 3 and the second end 4b of the fourth support arm 4. All support arms 1, 2, 3, 4 are produced at least partially, preferably completely by means of a bending process. All support arms 1, 2, 3, 4 have a bent contour over part of their length.

The connection element 5 with the opening 5a is attached to the support arms 1, 2, 3, 4 in the region of their second ends 1b, 2b, 3b, 4b, as in FIG. 1A, for example by means of a riveted or bolted connection.

FIG. 1C also shows the fastening elements 21, 22, wherein the fastening elements 23, 24 from FIG. 1A are concealed. The fastening elements 21, 22 are attached to the support arms 1, 2, 3, 4 in the region of their first ends 1*a*, 2*a*, 3*a*, 4*a*, for example by means of a riveted or bolted connection.

The fastening unit 100 has further fastening elements 31, 32 which are arranged at the side next to the first and third support arms 1, 3, and at the side next to the second and fourth support arms 2, 4 respectively. The fastening element 31 is held spaced from the first and third support arms 1, 3 by means of a spacer 41. The fastening element 32 is also held spaced from the second and fourth support arms 2, 4 by means of a spacer 42. The two spacers 41, 42 are formed plate-like. The further fastening elements 31, 32 are configured to fasten a portion of a tail fin paneling of the aircraft to the fastening unit 100, or hold this spaced therefrom. The spacers 41, 42 allow better tolerance compensation during assembly.

Figure 2A:
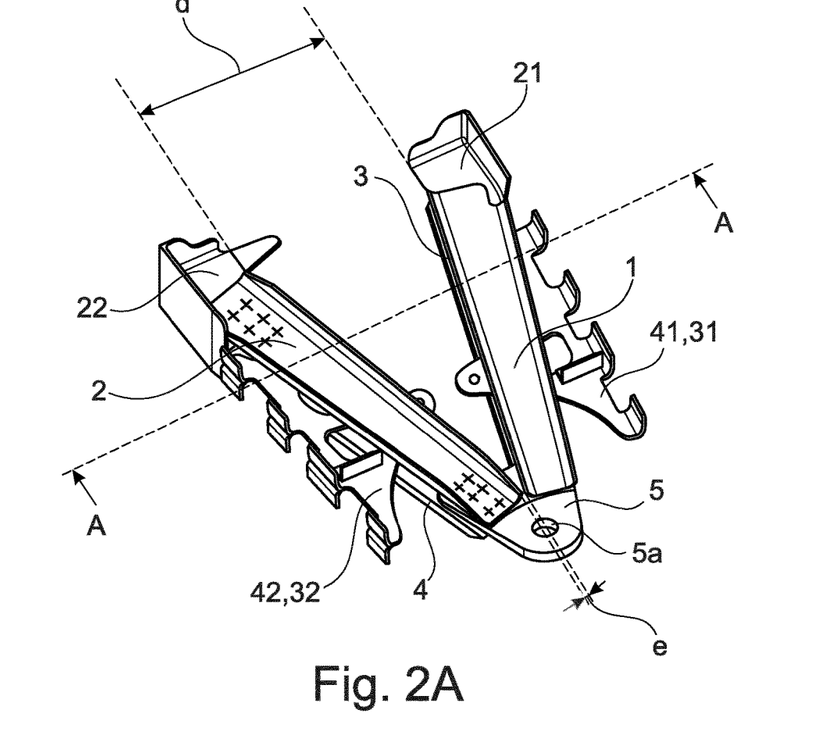
FIG. 2A shows a fastening unit with four support arms according to a further exemplary embodiment of the invention.
Figure 2B:
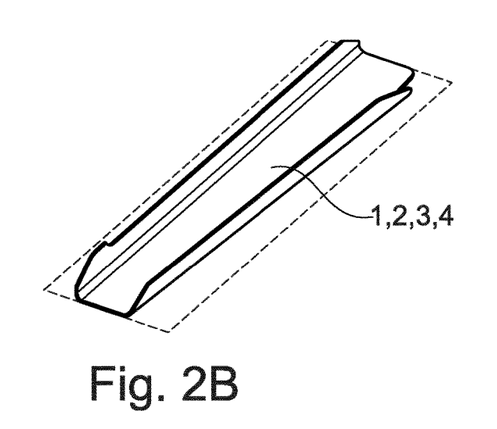
FIG. 2B shows a support arm according to an exemplary embodiment of the invention.

FIG. 2A shows a fastening unit with four support arms 1, 2, 3, 4. In this exemplary embodiment, the support arms 1, 2, 3, 4 have a straight, unbent contour in the main extension direction, and in this aspect differ from the support arms 1, 2, 3, 4 shown in FIGS. 1A and 1C. The support arms 1, 2, 3, 4 in FIG. 2A have a U-shaped profile. As clearly evident in FIG. 2B, the flanges or legs of the U-shaped profile of the support arms 1, 2, 3, 4 run towards each other starting from the first ends of the support arms towards the second ends of the support arms, so as to give a tapering shape of the individual support arms 1, 2, 3, 4 along their respective main extension directions.

Here again, distance d in the region of the first ends of the support arms 1, 2, 3, 4 decreases down to a distance e in the region of the second ends of the support arms 1, 2, 3, 4. The reduction in distance is continuous. The fastening elements 21, 22 which attach the first support arm 1 and second support arm 2 respectively to the support structure (not shown) are here designed as milled components, but may also be produced by means of a bending process.

The connection element 5 with the opening 5*a* is attached to the two ends of the support arms 1, 2, 3, 4 by means of a riveted or bolted connection. The fastening means of these connections are depicted in the figures as crosses. Screwed or welded connections are also possible here. The fastening elements 21, 22 are also attached to the support arms 1, 2, 3, 4 by means of riveted or bolted connections.

The spacers 41, 42 space a portion of a tail fin (not shown in FIG. 2A) from the support arms 1, 2, 3, 4 of the fastening unit 100. The spacers 41, 42 can in particular compensate for tolerances, which may be advantageous when attaching the tail fin to the fastening unit. The spacers 41, 42 may simultaneously serve as fastening elements 31, 32 for fastening a tail fin paneling to the fastening unit 100.

Figure 2C:
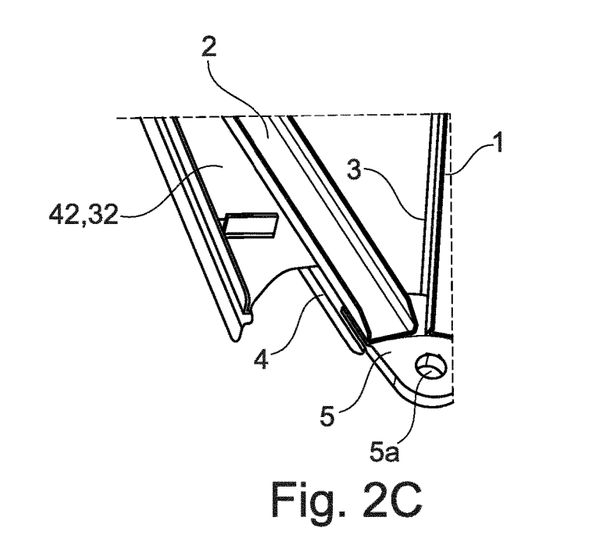
FIG. 2C shows an extract of a fastening unit with four support arms according to an exemplary embodiment of the invention.

FIG. 2C shows an extract of a fastening unit with four support arms 1, 2, 3, 4, showing the spacer 42 on an enlarged scale. FIG. 2C shows in particular a preferred exemplary embodiment of the fastening unit 100 with the spacer 42, which guarantees an effective tolerance compensation on assembly of the tail fin.

Figure 2D:
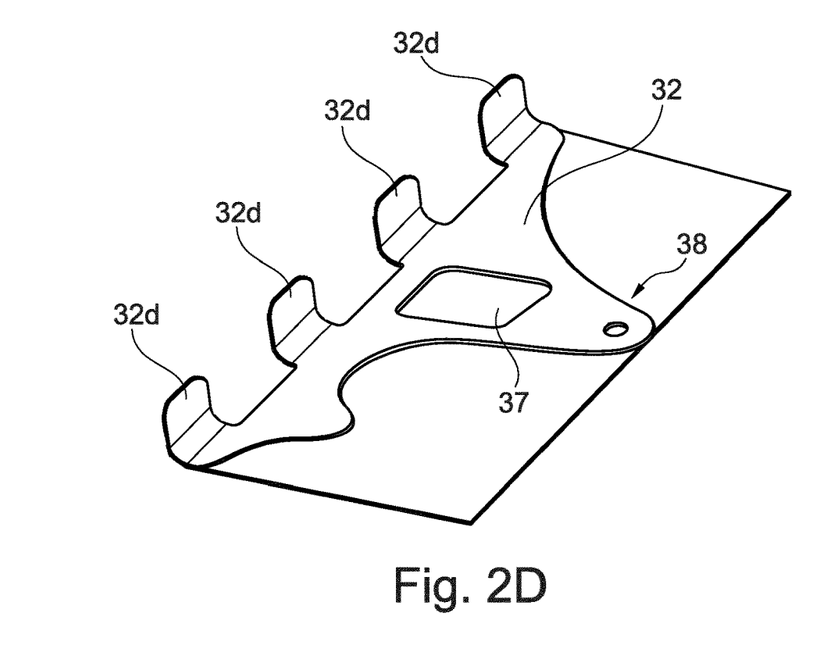
FIG. 2D shows a spacer for fastening a support arm to a tail fin of an aircraft according to an exemplary embodiment of the invention.

FIG. 2D shows a perspective, individual view of the spacer 42 or fastening element 32. The spacer 42 extends mainly in a plane 38, but has protrusions 32*a*, 32*b*, 32*c*, 32*d* protruding perpendicularly to the plane 38. The spacer 42 furthermore has a cutout 37 in the form of a rectangular passage hole.

Figure 2E:
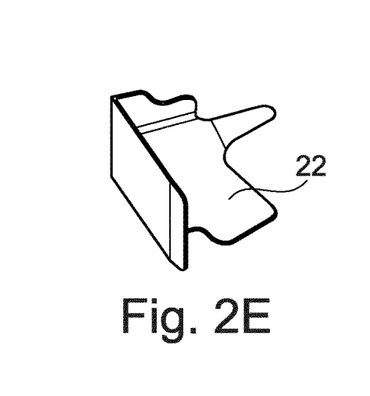
FIG. 2E shows a fastening element according to an exemplary embodiment of the invention.
Figure 2F:
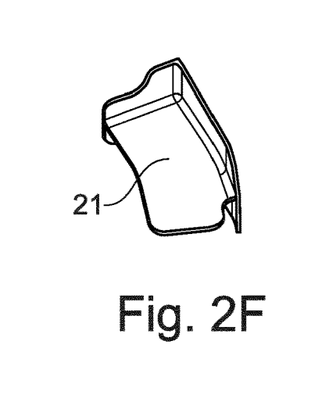
FIG. 2F shows a fastening element according to a further exemplary embodiment of the invention.

FIGS. 2E and 2F show fastening elements 22, 23 which are produced in a milling process. The fastening elements 22, 23 serve for fastening the support arms 1, 2, 3, 4, shown in FIG. 2A, to the support structure (not shown).

Figure 2G:
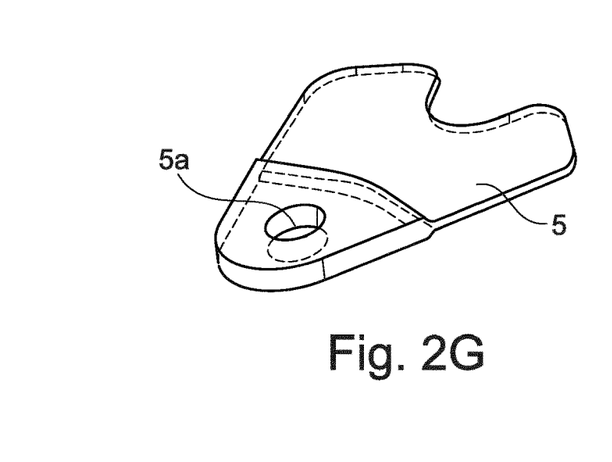
FIG. 2G shows a connection element according to an exemplary embodiment of the invention.

FIG. 2G shows a connection element 5 with an opening 5*a*. The connection element 5 has two regions, of which a first region has a smaller thickness than a second region. The connection element 5 is produced by a milling process. The opening 5*a* is a continuous hole through the second, thicker region of the connection element. The opening 5*a* is formed circular so that the opening has the shape of a passage bore through the second region.

Figure 2H:
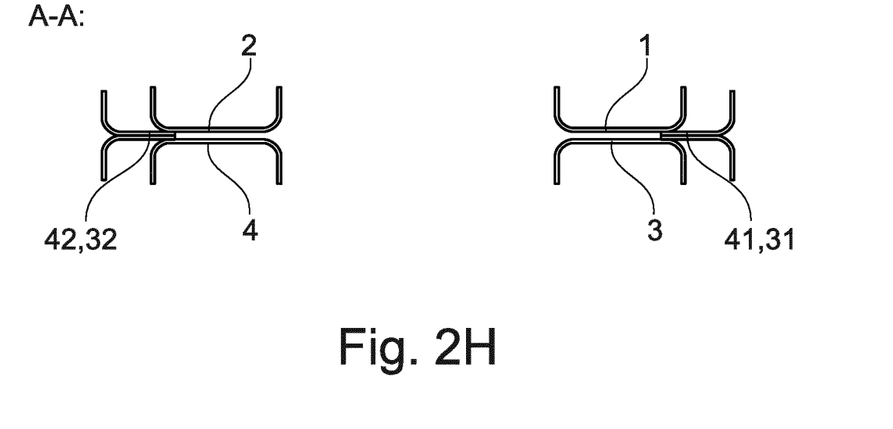
FIG. 2H shows a cross-section through a fastening unit according to an exemplary embodiment of the invention.

FIG. 2H shows the sectional view A-A through the fastening unit 100 from FIG. 2A. It is evident that the further fastening elements 31, 32 or the spacers 41, 42 extend at least partially between the support arms 1, 2, 3, 4. In particular, the fastening element 31 extends at least partially between the first support arm 1 and the third support arm 3. The fastening element 32 extends at least partially between the second support arm 2 and the fourth support arm 4. It is furthermore evident that the fastening elements 31, 32 each have two L-shaped profiles which are joined together by a flange or leg. The support arms 1, 2, 3, 4 each have U-shaped profiles. The spacers 41, 42 or the fastening elements 31, 32 may be moved in the plane between the support arms and adjusted to provide the necessary tolerance compensation.

Figure 3A:
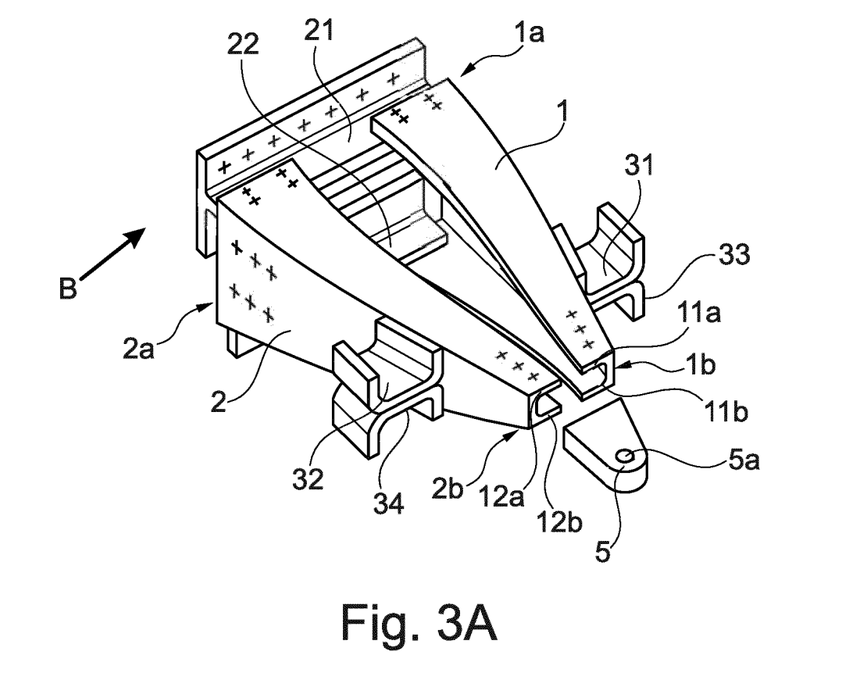
FIG. 3A shows a fastening unit with two support arms according to an exemplary embodiment of the invention.

FIG. 3A shows a fastening unit 100 with only two support arms 1, 2. The support arms 1, 2 each have a U-shaped profile. The fastening unit 100 may be configured for movably fastening an aircraft component to a support structure of an aircraft. For the sake of clarity, the support structure and the aircraft component are not shown in FIG. 3A, but only the fastening unit 100 is shown. The fastening unit 100 has a connection element 5 with an opening 5*a*. The opening 5*a* is a continuous hole, in particular a passage bore for receiving a bolt (not shown in FIG. 1A), via which the aircraft component is movably held on the fastening unit 100. The fastening unit 100 has a first support arm 1 with a first end 1*a* for connecting the first support arm 1 to the support structure (not shown) of the aircraft, and a second end 1*b* for connecting the first support arm 1 to the connection element 5. The fastening unit 100 furthermore has a second support arm 2 with a first end 2*a* for connecting the second support arm 2 to a support structure (not shown) of the aircraft, and a second end 2*b* for connecting the second support arm 2 to the connection element 5.

The fastening unit 100 has a first fastening element 21 for fastening the first support arm 1 and the second support arm 2 to the support structure, and a second fastening element 22 for fastening the first support arm 1 and the second support arm 2 to the support structure. The fastening elements 21, 22 have a T-shaped cross-sectional profile.

The web of the T-shaped profile of the first fastening element 21 is connected to a flange of the U-shaped profile of the first support arm 1 via a bolted or riveted connection. The connection and the fastening means necessary for this are depicted in FIG. 3A by means of crosses. The web of the T-shaped profile of the first fastening element 21 is in contact with a flange of the U-shaped profile of the first support arm 1.

The web of the T-shaped profile of the first fastening element 21 is also connected to a flange of the U-shaped profile of the second support arm 2 via a bolted or riveted connection. The connection and the fastening means necessary for this are also depicted in FIG. 3A by means of crosses. The web of the T-shaped profile of the first fastening element 21 is in contact with a flange of the U-shaped profile of the second support arm 2.

Similarly, the web of the T-shaped profile of the second fastening element 22 is also connected to a flange of the U-shaped profile of the first support arm 1 via a bolted or riveted connection, and the web of the T-shaped profile of the second fastening element 22 is connected to a flange of the U-shaped profile of the second support arm 2 via a bolted or riveted connection. A contact between the web of T-shaped profile of the second fastening element 22 and the corresponding flange of the support arms 1, 2 may be provided. The flanges of the first support arm 1 and the flanges of the second support arm 2 are arranged facing each other. In particular, the two support arms 1, 2 are arranged mirror-symmetrically relative to a central plane which divides the two fastening elements 21, 22 into two portions.

Since the support arms 1, 2 in FIG. 3A have different loading directions from those in FIGS. 1A and 2A, the U-shaped profiles of the support arms 1, 2 from FIG. 3A may also be described as C-shaped profiles.

The connection element 5 is arranged between the two flanges 11a, 11b of the U-shaped profile of the first support arm 1. In addition, the connection element 5 is also arranged between the two flanges 12a, 12b of the U-shaped profile of the second support arm 2.

The first support arm 1 and the second support arm 2 are arranged such that a distance between the first end 1a of the first support arm 1 and the first end 2a of the second support arm 2 is greater than a distance between the second end 1b of the first support arm 1 and the second end 2b of the second support arm 2. For example, these distances are each defined as the distance between the respective opposing flanges 11a and 12a, or 11b and 12b, of the support arms 1, 2, or as the distances between two mutually facing side faces of the webs of the U-shaped profiles of the support arms 1, 2.

The first support arm 1 has further fastening elements 31, 33 which are attached to the web of the U-shaped profile of the first support arm 1 by means of a bolted or riveted connection. The second support arm 2 has further fastening elements 32, 34 which are attached to the web of the U-shaped profile of the second support arm 2 by means of a bolted or riveted connection. The fastenings are again depicted in FIG. 3A as crosses. The fastening elements 31, 32, 33, 34 each have a U-shaped profile. The flanges of the U-shaped profiles of the fastening elements 31, 32, 33, 34 are connected to the webs of the respective support arms 1 or 2. The U-shaped profiles of the fastening elements 31 and 33 are each connected together or are in contact with each other via their webs. The U-shaped profiles of the fastening elements 32 and 34 are also connected together or in contact with each other via their webs.

Figure 3B:
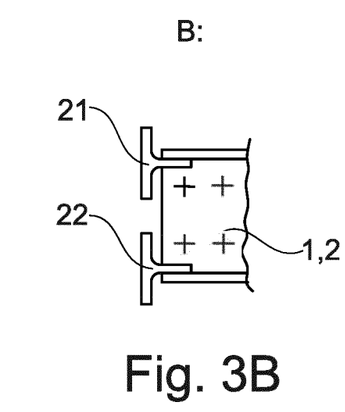
FIG. 3B shows fastening elements for fastening a support arm to a support structure according to an exemplary embodiment of the invention.
Figure 3C:
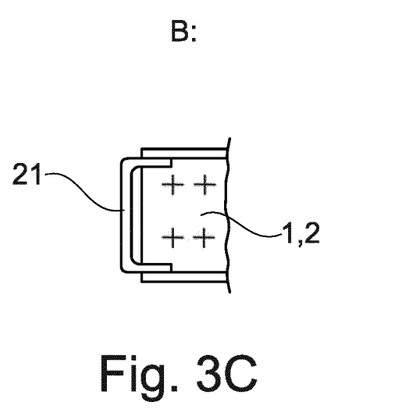
FIG. 3C shows fastening elements for fastening a support arm to a support structure according to a further exemplary embodiment of the invention.

FIGS. 3B and 3C show the fastening elements 21, 22 for fastening the support arms to the support structure (not shown). FIG. 3B shows the depiction of the fastening elements 21, 22 from FIG. 3A. FIG. 3C shows the fastening elements 21, 22 for the case that, instead of the T-shaped profiles, a single U-shaped profile is used as a fastening element 21 which fastens the first support arm 1 and the second support arm 2 to the support structure.

Figure 3D:
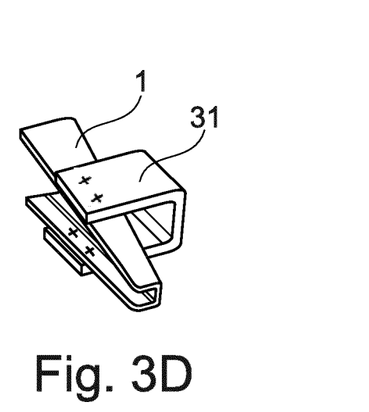
FIG. 3D shows fastening elements for fastening a support arm to a tail fin of an aircraft according to an exemplary embodiment of the invention.

FIG. 3D shows a further fastening element 31 for fastening the first support arm 1 to a tail fin of an aircraft. A U-shaped profile is used for the further fastening element 31, wherein the U-shaped profile at least partially surrounds the first support arm 1. The flanges of the U-shaped profile of the further fastening element 31, and the flanges of the U-shaped profile of the first support arm 1, are in contact with each other. This arrangement is also possible for the second support arm 2.

Figure 3E:
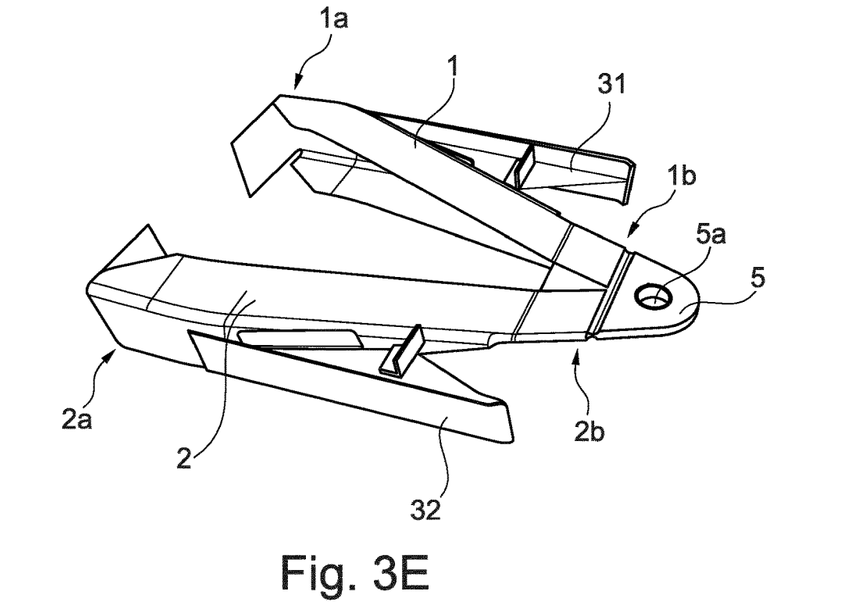
FIG. 3E shows a fastening unit with two support arms according to a further exemplary embodiment of the invention.

FIG. 3E shows a fastening unit 100 with only two support arms 1, 2. The two support arms 1, 2 taper, in that the flanges of the support arms 1, 2 run towards each other continuously but do not touch. In the region of the second ends 1b, 2b of the support arms 1, 2, there is no web in the U-shaped profile of the two support arms 1, 2. In this region, the connection element 5 is also arranged between the flanges of the support arms 1, 2. The fastening unit 100 comprises the further fastening elements 31, 32 for fastening paneling parts of a tail fin to the support arms 1, 2.

Figure 4:
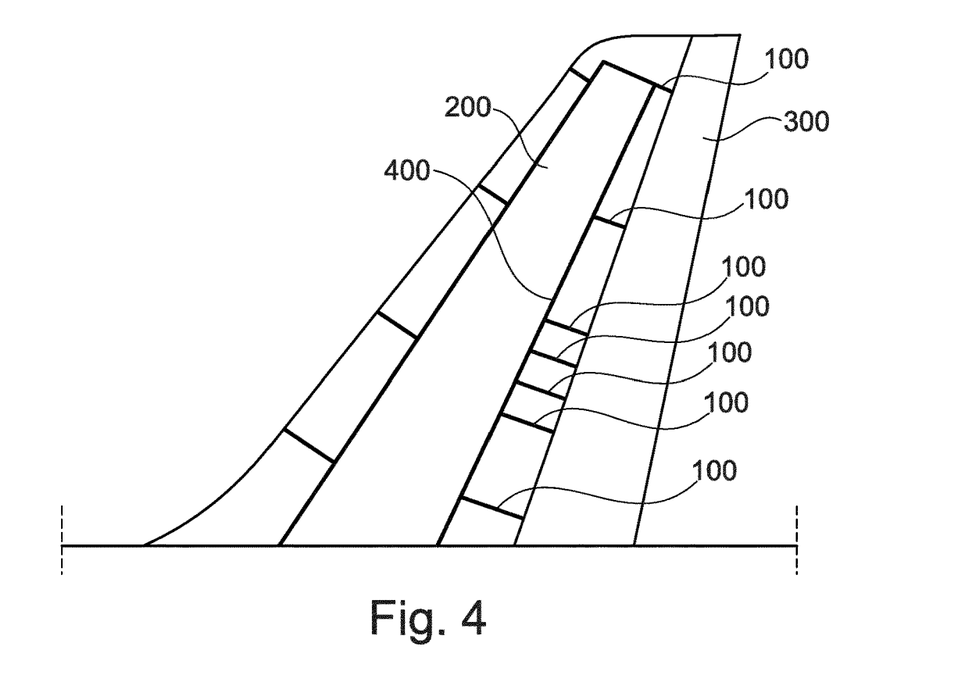
FIG. 4 shows a tail fin with a fastening unit according to an exemplary embodiment of the invention.

FIG. 4 shows a tail fin 200 with several fastening units 100 for fastening a rudder 300. The tail fin 200 has a support structure 400 in the form of a support spar, to which the rudder 300 is fastened via the fastening units 100. It may be provided that the rudder 300 is fastened to the support structure 400 only via a single fastening unit 100.

Figure 5:
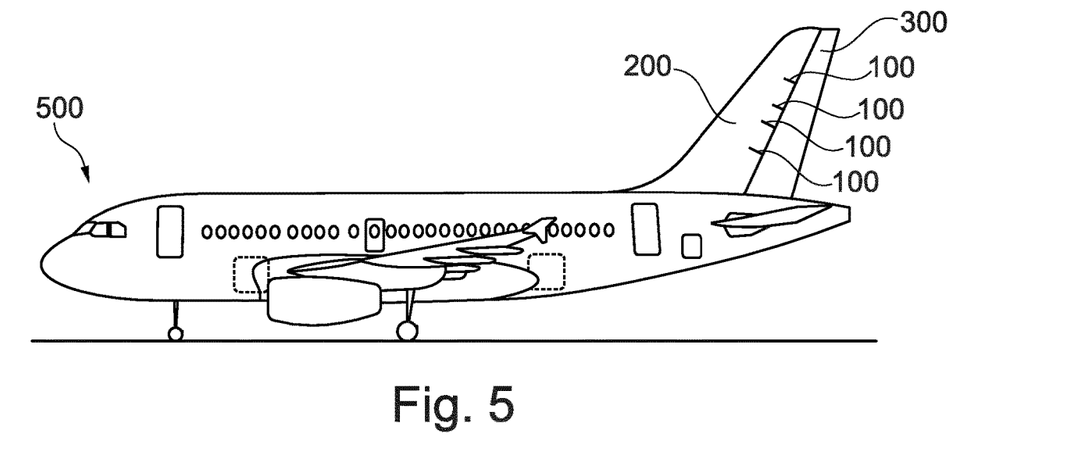
FIG. 5 shows an aircraft with a fastening unit according to an exemplary embodiment of the invention.

FIG. 5 shows an aircraft 500, in particular an aircraft with a fastening unit 100. The fastening unit 100 is arranged in a tail fin 200 of the aircraft 500. The fastening unit 100 fastens the rudder 300 to the tail fin 200 of the aircraft 500.

Figure 6:
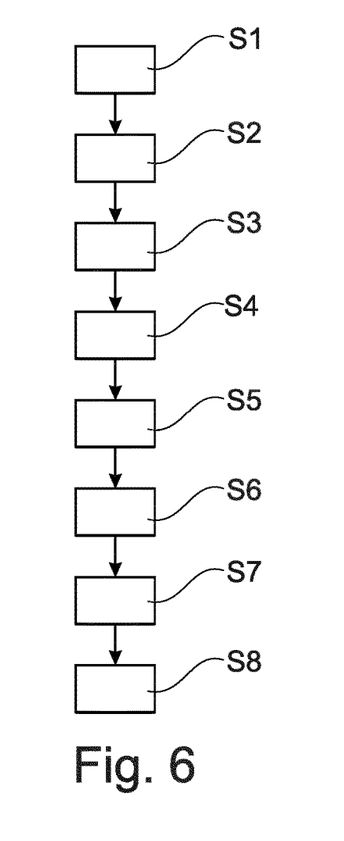
FIG. 6 shows a flow diagram for a method for producing a fastening of an aircraft component to a support structure of an aircraft according to an exemplary embodiment of the invention.

FIG. 6 shows a flow diagram for a method for producing a movable fastening of an aircraft component 300 to a support structure 400 of an aircraft 500. In a step S1 of the method, a connection element 5 with an opening 5a is provided. In a further step S2, a first preform is formed into a first support arm 1 with a first end 1a and a second end 1b. In a further step S3, a second preform is formed into a second support arm 2 with a first end 2a and a second end 2b. In a further step S4, the first support arm 1 is arranged relative to the second support arm 2 such that a distance d between the first end 1a of the first support arm 1 and the first end 2a of the second support arm 2 is greater than the distance e between the second end 1b of the first support arm 1 and the second end 2b of the second support arm 2. In a further step S5, the first end 1a of the first support arm 1 is connected to the support structure 400. In a further step S6, the first end 2a of the second support arm 2 is connected to the support structure 400. In a further step S7, the second end 1b of the first support arm 1 is connected to the connection element 5. In a further step S8, the second end 2b of the second support arm 2 is connected to the connection element 5.

The invention claimed is:

1. A fastening unit for movably fastening an aircraft component to a support structure of an aircraft, comprising:
    a connection element with an opening;
    a first support arm with a first end for connecting to the support structure of the aircraft and a second end for connecting to the connection element;
    a second support arm with a first end for connecting to the support structure of the aircraft and a second end for connecting to the connection element;
    a third support arm with a first end for connecting to the support structure of the aircraft and a second end for connecting to the connection element;
    a fourth support arm with a first end for connecting to the support structure of the aircraft and a second end for connecting to the connection element;
    a first spacer extending from between the first support arm and the third support arm;
    a second spacer extending from between the second support arm and the fourth support arm;
    a first fastening element held spaced from the first and third support arms by the first spacer;
    a second fastening element held spaced from the second and fourth support arms by the second spacer;
    wherein the connection element is arranged between the first support arm and the third support arm; and/or wherein the connection element is arranged between the second support arm and the fourth support arm;

wherein the first support arm and the second support arm are arranged such that a first distance between the first end of the first support arm and the first end of the second support arm is greater than a second distance between the second end of the first support arm and the second end of the second support arm;

wherein the first support arm is produced at least partially by a forming process;

wherein the first support arm and the second support arm are produced by a bending process; and wherein the first support arm and the second support arm are produced at least partially from a metallic material.

2. The fastening unit as claimed in claim 1, wherein the first support arm and the second support arm have a U-shaped profile.

3. The fastening unit as claimed in claim 2, wherein a third distance between a flange of the U-shaped profile of the first support arm and a flange of the U-shaped profile of the second support arm decreases starting from the first end of the first support arm in the direction of the second end of the first support arm.

4. A fastening unit for movably fastening an aircraft component to a support structure of an aircraft, comprising:
a connection element with an opening;
a first support arm with a first end for connecting to the support structure of the aircraft and a second end for connecting to the connection element;
a second support arm with a first end for connecting to the support structure of the aircraft and a second end for connecting to the connection element;
a first spacer extending from between the first support arm and the second support arm;
a first fastening dement held spaced from the first and second support arms by the first spacer;
wherein the connection element is arranged between two flanges of the first support arm; and/or wherein the connection element is arranged between two flanges of the second support arm;
wherein the first support arm and the second support arm are arranged such that a first distance between the first end of the first support arm and the first end of the second support arm is greater than a second distance between the second end of the first support arm and the second end of the second support arm;
wherein the first support arm is produced at least partially by a forming process;
wherein the first support arm and the second support arm are produced by a bending process; and
wherein the first support arm and the second support arm are produced at least partially from a metallic material.

5. The fastening unit as claimed in claim 1, comprising:
a third fastening element, via which the first end of the first support arm is attached to the support structure of the aircraft;
wherein the third fastening element is produced by a bending process; and
wherein the first, second, and third fastening elements have L-shaped profiles, and the L-shaped profile of the third fastening element lies on a plane normal to a plane on which the L-shaped profiles of the first and second fastening elements lie.

6. The fastening unit as claimed in claim 1, wherein the third support arm and the fourth support arm are arranged such that a fourth distance between the first end of the third support arm and the first end of the fourth support arm is greater than a fifth distance between the second end of the third support arm and the second end of the fourth support arm.

7. A method for providing a movable fastening of an aircraft component to a support structure of an aircraft, comprising:
providing a connection element with an opening;
forming a first preform into a first support arm with a first end and a second end;
forming a second preform into a second support arm with a first end and a second end;
forming a third preform into a third support arm with a first end and a second end;
forming a fourth preform into a fourth support arm with a first end and a second end;
producing the first support arm and the second support arm by a bending process;
producing the first support arm and the second support arm at least partially from a metallic material;
arranging the first support arm relative to the second support arm such that a first distance between the first end of the first support arm and the first end of the second support arm is greater than a second distance between the second end of the first support arm and the second end of the second support arm; connecting the first end of the first support arm to the support structure;
connecting the first end of the second support arm to the support structure;
connecting the second end of the first support arm to the connection element;
connecting the second end of the second support arm to the connection element; connecting the second end of the third support arm to the connection element;
connecting the second end of the fourth support arm to the connection element;
positioning a first spacer to extend from between the first support arm and the third support arm; positioning a second spacer to extend from between the second support arm and the third support arm;
spacing a first fastening element from the first support arm and the third support arm with the first spacer;
spacing a second fastening element from the second support arm and the fourth support arm with the second spacer.

8. The fastening unit as claimed in claim 1, wherein the spacers extend in opposite directions.

9. The fastening unit as claimed in claim 1, wherein the first and second fastening elements are configured to fasten a portion of a tail fin paneling of the aircraft to the fastening unit.

10. The fastening unit as claimed in claim 1, wherein the fastening elements have an L-shaped profile.

11. The method of claim 7, comprising positioning the spacers to extend in opposite directions.

12. The method of claim 7, wherein the first and second fastening elements are configured to fasten a portion of a tail fin paneling of the aircraft to the fastening unit.

13. The method of claim 7, wherein the fastening elements have an L-shaped profile.

14. The method of claim 7, comprising moving spacers or the fastening elements between the support arms to provide the necessary tolerance compensation.

* * * * *